[72] Inventor Toshiyuki Mori
Tokyo, Japan
[21] Appl. No. 477,259
[22] Filed Aug. 4, 1965
[45] Patented Aug. 25, 1970
[73] Assignee Olympus Optical Co., Inc.
Tokyo, Japan
[32] Priority Aug. 10, 1964
[33] Japan
[31] 39/62,841, 39/62,842

[54] FLEXIBLE LIGHT TRANSMITTING INSTRUMENT AND FLEXIBLE TUBE FOR SAID INSTRUMENT
3 Claims, 12 Drawing Figs.
[52] U.S. Cl. .................................................. 128/6
[51] Int. Cl. .................................................. A61b 1/06
[50] Field of Search ........................................ 128/6–14,
16, 18, 22, 3, 9, 11, 13

[56] References Cited
UNITED STATES PATENTS

| | | | |
|---|---|---|---|
| 2,975,785 | 3/1961 | Sheldon | 128/6 |
| 3,071,161 | 1/1963 | Ulrich | 128/8X |
| 3,081,767 | 3/1963 | Hett | 128/6 |
| 3,090,378 | 5/1963 | Sheldon et al. | 128/4 |
| 3,091,235 | 5/1963 | Richards | 128/6 |
| 3,100,482 | 8/1963 | Hett | 128/6 |
| 3,132,646 | 5/1964 | Hett | 128/6 |
| 3,190,286 | 6/1965 | Stokes | 128/6 |
| 3,253,524 | 5/1966 | Ashizawa et al. | 128/6UX |

*Primary Examiner* — Richard A. Gaudet
*Assistant Examiner* — Kyle L. Howell
*Attorney* — Otto John Munz ABSTRACT: A flexible tube extends between a proximal, maneuvering end and a distal end. Within this tube runs a fiber bundle for the transmission of light. A lens is located at the distal end and the relative position of the lens and the fiber bundle at the distal end is controlled by a rope passing within a conduit tube from the maneuvering end to the distal end. The rope movement is stepwise between predetermined positions. Flexing of the flexible tube is achieved by a double-pawl ratchet device which controls at the maneuvering end the reciprocal movement of ropes passing clockwise and counter-clockwise from a drum through the flexible tube to its distal end. Stable flexing is achieved in the tube by a flexible wire net covering of individual guide rings.

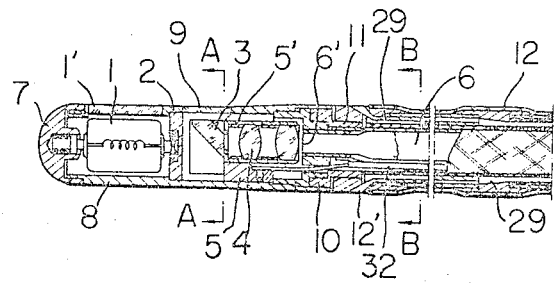

INVENTOR.
TOSHIYUKI MORI.
ATTORNEY.

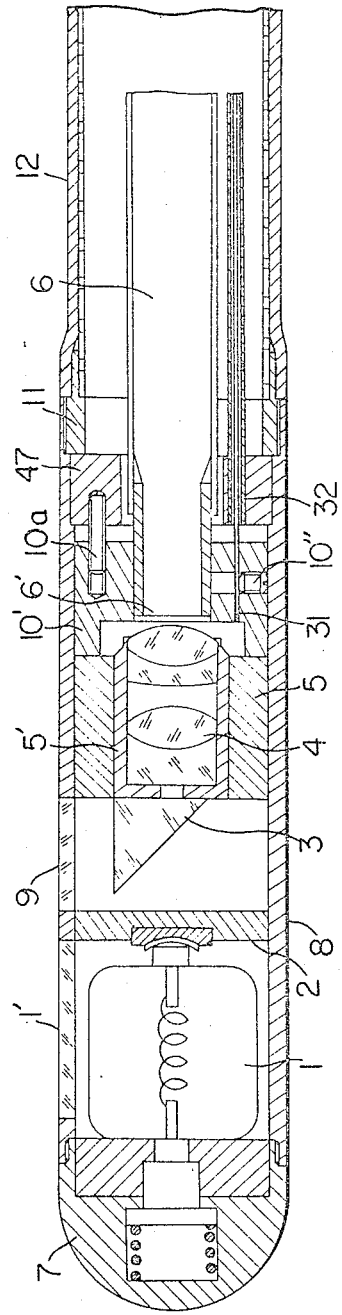
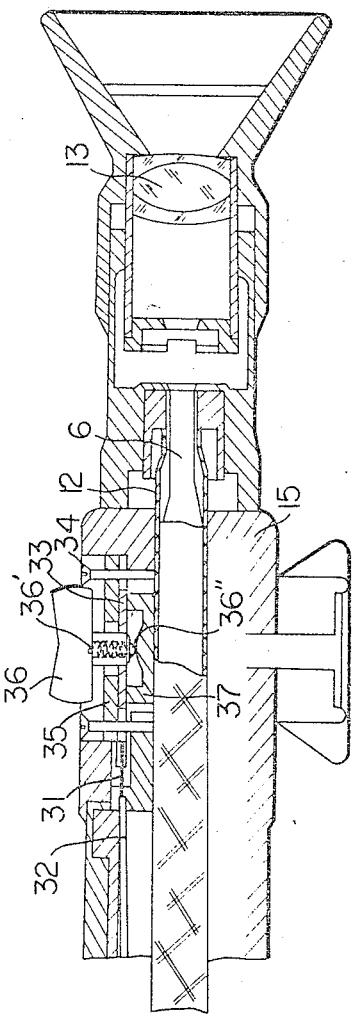

FLEXIBLE LIGHT TRANSMITTING INSTRUMENT AND FLEXIBLE TUBE FOR SAID INSTRUMENT

BACKGROUND OF THE INVENTION

1. Field of the Invention

The present invention relates to improved, elongated and flexible light transmitting instruments and flexible tubes to be employed in such instruments.

2. Description of the Prior Art

There have been proposed various elongated, flexible, optical light and visual image transmitting instruments comprising a bundle of transparent fibers such as glass fibers closely held against one another in aligned relation in the longitudinal direction of the instrument and in which one end portion of the bundle is provided with an objective lens or lenses to receive the image of an object and transmit the image through the fiber bundle to its opposite end where the transmitted light or image is viewed with or without magnification through an eyepiece.

In one type of conventional, flexible, light transmitting instrument comprising a bundle of flexible fibers, the fiber bundle flexes freely. The objective lens is moved a predetermined distance in the longitudinal direction of the instrument by means of a relatively inflexible cable with one end secured to the proximal maneuvering end portion of the instrument. However, the tension in the cable varies depending upon the flexing of the fiber bundle. Accordingly, it is very difficult to move the lenses to desired positions and hold them in place, while changing the overall curvature of the flexible tube.

In the above conventional, flexible, light-transmitting instrument comprising a freely flexible, tubular bundle formed of flexible fibers, a flexible tube is provided between the distal and proximal ends of the instrument for insertion into the viscera or other complexly bent portions within a human body for visual internal examination of these organs. The distal end portion of the flexible tube is inserted into the organs along the bending contour of the object or objects to be examined. Within the flexible tube, a pulling or maneuvering wire extends throughout its length, this wire is manipulated from the maneuvering end section of the instrument and flexes the tube as desired. However, this type of conventional, flexible instrument cannot be always flexed so as to precisely conform with the particular contour of every part of an object within the human body. This drawback renders the tube inpractical for various applications. Furthermore, the construction and arrangement of the conventional flexible tube is rather complicated and as a result, the inner space of the tube, in which various examination elements for diagnosis are to be housed, is substantially restricted. This necessitates construction of flexible tubes of such large diameter that it becomes difficult to insert them into the human body.

There has been proposed another type of flexible, light-transmitting instrument adapted for insertion into the viscera and other organs of a human body for visual internal examination thereof. In this type, only the distal end portion of the instrument is maneuvered into the human body for internal examination of an inner organ or object therein.

Although the distal end portion of this instrument may be oriented in any desired direction after insertion, it is difficult to cause the end portion to precisely follow the contour of the object during insertion. This renders such an instrument impractical.

SUMMARY OF THE INVENTION

The present invention relates to improvements in the above-mentioned conventional image transmitting instruments. The novel, flexible, light or image-transmitting instruments, according to the present invention, are particularly designed for insertion into inaccessible places, such as the viscera and other complexly bent regions of the human body for visual internal examination of such internal organs. The instruments can be easily maneuvered into position in such normally inaccessible places by virtue of their novel flexible tubes and maneuvering means.

In order to minimize the obscuration of the image of an illuminated object transmitted by a fiber bundle as well as to provide clear observation of the image, a novel maneuvering means is provided for longitudinal movement of an objective lens between a position for short distance observation and a position for long distance observation. This maneuvering means can be easily operated by manipulation of a simple shifting device.

Another object of the present invention is to provide a flexible bundle of glass fibers in which an inextensible and incompressible tube having substantial length is provided extending between the distal end, where the objective lens system is located, and the proximal end where observation of illuminated objects is performed. The opposite ends of the inextensible and incompressible tube are secured at the distal and proximal ends of the instrument respectively so that the extension and compression of the tube may not be affected by any flexing of the fiber bundle. An inextensible and incompressible cable is further provided within the tube extending throughout its length. One end of the cable is secured at a shifting device for the objective lenses provided at the maneuvering end of the instrument. The other end is secured to the objective lens system. Those skilled in the art will recognize that this is a Bowden-type cable arrangement. When the cable is moved at the maneuvering end by a predetermined amount through manipulation of the shifting device, such movement of the cable may be precisely transmitted to the other end to which the lenses are attached enabling the lens system to be shifted into either one of two alternative positions. The effect of flexing of the instrument is avoided by providing sufficient length for the tube and cable.

Generally in an image-transmitting instrument formed of a plurality of flexible fibers, the adjustment of the focus of the lenses between only two positions, that is, a position in which a short distance observation is effected and another position in which a relatively long distance observation is performed, can produce as complete and clear an image as desired, due to the depth of focus of the objective lenses if, a shifting device which can move the objective lenses between three or more positions can be employed if desired. However, for practical purposes, the adjustment of the lenses between the above-mentioned two positions is sufficient and in fact the two-position adjustment is easier than three or more position adjustment.

Another object of the present invention is to provide a flexible tube for use in the novel light-transmitting instruments for internal examination of human beings. The distal end of the instrument can be easily inserted into a bent internal organ or object of a human being to be examined. After the distal end has been inserted, the tube may be easily oriented to any desired portion of the organ.

A further object of the present invention is to provide an improved flexible tube for use in the novel light transmitting instruments of the invention. These instruments have a simpler construction for attaining the above objects and can be easily manufactured at less expense.

A further object of the present invention is to provide a novel small diameter flexible tube for light transmitting instruments which occupies relatively less space within the instrument than prior art tubes while providing a larger inner space for housing various examination elements, its bending action being remotely controlled.

A further object is to provide a tube and cable arrangement for focusing adjustment, wherein the tube or sheath has a small diameter and has its ends attached to fixed portions of the distal and proximal ends respectively. The push-pull cable has one end secured to a sliding member at the proximal end. The other end of the cable is attached to a slidable fiber bundle binding means adjacent, but not connected to, the lenses. This arrangement allows remote adjustment of the distance between the end of the fiber bundle and the objective lenses.

BRIEF DESCRIPTION OF THE DRAWING

The above and other objects and advantages of the present invention will be more readily apparent from the following description when read in connection with the accompanying drawings.

The identical or corresponding parts are shown with the same numeral references throughout the various figures of the accompanying drawings, in which:

FIG. 1 is a fragmentary, longitudinal, sectional view of a preferred form of the light-transmitting instrument embodying the present invention showing the distal end portion thereof;

FIG. 2 is a cross-sectional view taken along the line A—A of FIG. 1 showing one half of the section;

FIG. 3 is a cross-sectional view taken along the line B—B of FIG. 1 showing one half of the section;

FIG. 4 is a fragmentary, longitudinal, sectional view of the intermediate portion of said instrument showing the disposition of a maneuvering rope provided therein;

FIG. 5 is a fragmentary, longitudinal, sectional view of the proximal end portion of said instrument showing a two-focus-position-adjusting device, means for manipulating a flexible tube, and an eyepiece;

FIG. 11 is a fragmentary, longitudinal, sectional view of a modified form of light-transmitting device embodying the present invention and showing the distal end portion thereof; and FIG. 12 is a fragmentary, longitudinal, sectional view of the instrument shown in FIG. 11 showing the proximal end portion thereof.

DESCRIPTION OF THE PREFERRED EMBODIMENTS

Figure 6:
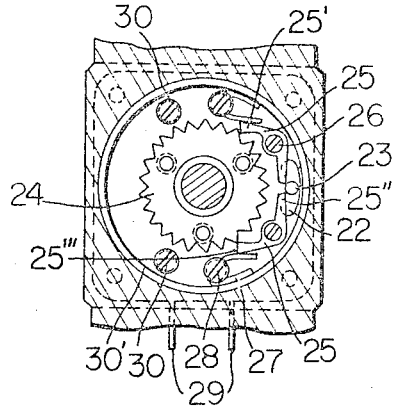
FIG. 6 is a cross-sectional view taken along the line C—C of FIG. 5 showing a ratchet mechanism provided at the proximal or maneuvering end portion of said instrument.
Figure 7:
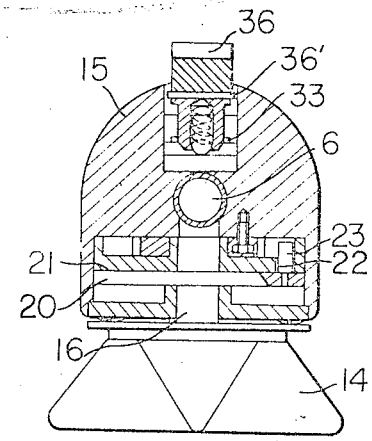
FIG. 7 is a cross-sectional view taken along the line D—D of FIG. 5 showing maneuvering means and a two-focus-position adjusting device.

With reference to the accompanying drawings and especially to FIGS. 1 to 7 thereof, a preferred form of light transmitting instrument is illustrated. FIG. 1 shows its distal end portion. This portion of the instrument is provided, at its extreme fore end, with a cap 7 and a cylindrical, sheath member 8. These together house a lamp 1. A transparent window 1' is provided in the periphery of the cylindrical, sheath member 8 so that light from the lamp 1 may be cast onto the subject of observation. The lamp 1 is adapted to be supplied with a controlled quantity of electric power from the proximal maneuvering end portion through a suitable conductor means. A transverse partition 2 is firmly secured within the sheath member 8. It is provided with an insulating member for holding one contact of the lamp 1. Parallel guide walls 2' are provided within the sheath member 8 at the side opposite to the side of the lamp 1 and as shown in FIG. 2 these guide walls 2' are positioned vertically within the sheath member. A cylindrical barrel 5 having a lens holding frame 5' for supporting an objective lens system 4 is located within the sheath member 8 for slidable movement therein in the longitudinal direction. Depending parallel walls 5" are guided by the above parallel walls 2' and are forwardly and backwardly movable in the longitudinal direction within the sheath member 8, but are prevented from rotating therein.

A prism 3 is provided on the front surface of the cylindrical barrel 5 within the sheath member 8. The prism is adapted to reflect rays of light which enter through light window 9 provided in the sheath member 8 in alignment with the window 1. The prism directs the light rays through an iris provided in front of the objective lens system 4 toward the lens system. The transmitted light ray is received by the fore end 6' of the fiber bundle 6. The cylindrical, sheath member 8 is connected through a connecting member 10 to a sleeve member 11 around which the front end portion of a flexible tube 12 is secured. The fiber bundle 6 passes through the interior of the sleeve member 11 and the instrument body 15 to reach the proximal or maneuvering end portion of the instrument. The light which has been transferred from one end 6' to the other end 6" of the fiber bundle is viewed as a magnified image through an eyepiece 13 provided at the proximal end of the instrument (FIG. 5).

When the above light transmitting instrument is inserted at the distal end portion into an usually inaccessible, bent, inner portion such as a cavity in a human body, the lamp 1 illuminates the sectioned selected portion of the cavity and the image of that portion is received by window 9 and transmitted through the prism 3, the objective lens system 4 and the fiber bundle 6 to the eyepiece 13 at the proximal end where the magnified image is viewed.

The novel light-transmitting instrument of the present invention can be maneuvered to bend the flexible tube 12 as desired by means of a knob 14 provided at the proximal end. The construction of the knob and the manner in which it operates will be explained hereinafter.

As explained above, regardless of any flexing movement of the fiber bundle 6 and the flexible tube 12, the objective lens system can be moved between two focusing positions by manipulating the proximal end portion. For this purpose, a small diameter inextensible and incompressible tube 32 is positioned beside the fiber bundle 6 within the instrument. One end of this tube is fixedly retained in the opening of the connecting member 10 by a rigid connection to the sleeve member 11 and the other end is rigidly secured in the opening of the body 15 at the proximal end portion. This tube 32 has a length sufficient to accommodate any flexing movement of the flexible tube 12 without being put under strain. An inextensible and incompressible cable 31 extends through the small diameter tube 32 and is slidably movable therein. One end of the cable is secured within the opening formed in the cylindrical barrel 5 which supports the objective lens system by suitable means such as a set screw as shown. The other end is secured to one end 31 of a slide plate 33 (FIG. 5) held on a retainer plate 35 by means of set screws 34 within the body 15. When the slide plate 33 is caused to slide by manipulating a shifting device 36 in a manner as hereinafter described in detail, the movement of the slide plate 33 is precisely transmitted through the rope to the cylindrical barrel 5. The small diameter tube 32 is of a relatively inflexible material and has a sufficient length enough to accommodate any flexing movement of the flexible tube 12. When the relatively inflexible cable 31 is moved by the movement of the slide plate 33, the movement of the cable relative to the tube 32 will be exactly the same amount at the opposite ends of the tube 32. Thus, the movement of the slide plate 33 is precisely transmitted to the cylindrical barrel 5 thereby moving the objective lens system 4 to a selected position within its two alternative positions. In order to move the slide plate 33, the above-mentioned shifting device 36 is employed. In the embodiment illustrated the device 36 is located on the body 15 at the proximal end portion and is rotatable about a pin 36' which extends into the body 15. The shifting device 36 is adapted to be tilted to either side, right or left, with respect to the semispherically shaped surface of shifting plate 37 by means of spherically pointed member 36" which is loaded by springs 37' disposed within a bore in the shank portion of the shifting device 36 in order to retain the slide plate 33 at either of two positions. The shifting device 36 may be of any conventional construction and design.

Thus, by pushing the shifting device 36 in one or the other direction so as to bias the device to a desired side, the objective lens system 4 may be precisely moved to either one of the two available focusing positions.

As shown in FIG. 5, a knob 14 having a shaft 16 firmly secured thereto is provided on the body 15 at the proximal end portion opposite to the shifting device 36 and the knob 14 is rotatably supported within a bore 18 formed in the body 15 and an aligned bore 19 formed in a covering member 17 secured on the body 15. A disc member 20 is firmly secured around the shaft 16. One surface of the disc member is in contact with the boss of the covering member 17. Thus, the shaft 16 and knob 14 cannot be displaced in the longitudinal direction of the instrument. A rotary drum 21 is mounted on the shaft 16 in face to face contact with the disc member 20.

The drum 21 is provided with an elongated arcuate slot 22 (FIG. 6) near its peripheral edge and a pin 23 provided on the adjacent surface of the disc member 20 passes through the slot 22 allowing the disc member 20 and drum 21 to move in relation to each other within a limited range. A ratchet wheel 24 is fixedly secured to the body 15 around the shaft 16 and is in contact with the drum 21. The sides of the teeth of this ratchet wheel 24 form equal angles with a radial line drawn to the tip of each tooth and are adapted to effect retention in one or the other direction as desired as described hereinafter. A pair of pawls 25 are rotatably mounted on one side of the drum 21 where the drum faces the ratchet wheel 24 and the pawls are symmetrically disposed with respect to the arcuate slot 22 in the drum 21. One end 25' of each pawl is adapted to engage the teeth of the ratchet wheel 24 by means of blocking surface 25''' while the other end 25'' is adapted to be engaged by the pin 23. As the pin 23 moves off center, the first end 25' is forced out of engagement with the ratchet wheel 24. These pawls 25 are normally biased by leaf springs 27 supported by the respective pins 28 in such a way that the one end 25' of each pawl may be maintained in engagement with the teeth on the ratchet wheel 24. Two strands of rope 29 and 29 are disposed around the outer periphery of the drum 21 for movement in two directions. One end of each rope is held by means of pin 30 and annular grooves 30' which are provided on the drum while the other end of each rope is guided through the flexible tube 12 to the opening 12' in the front end portion of the tube which is connected to the sleeve member 11 where the other end is secured in the opening by any suitable means such as brazing. The strands of rope 29, 29 are under a suitable amount of tension and as the drum 21 rotates either one of the two ropes is pulled so that the flexible tube 12 may be caused to bend in the desired direction.

As mentioned above, the pawls 25 are normally prestressed by the springs 27 so that their ends 25' may engage the teeth on the ratchet wheel 24 thereby preventing the wheel from rotating. When the knob 14 is rotated in one or the other direction the disc 20 follows the rotational movement of the knob 14 thereby causing the pin 23 to move within the slot 22 in either direction. As the pin 23 moves within the slot 22 the pin hits against the other end 25'' of one pawl 25 which lies in the path of movement of the pin 23 so as to bias the one pawl against the action of spring 27. The fore end 25' of the same pawl is thereby disengaged from the ratchet wheel 24 allowing the knob 14 to rotate further while the other pawl 25 is caused to gradually move over the teeth of the wheel 24 into engagement therewith by means of the associated spring 27. As a result the drum 21 can be prevented from rotation in the reverse direction when the knob 14 is released. Accordingly, when the knob 14 is prevented from rotating, the drum 21 is stopped in its rotational movement and is immediately held in position, whereby the flexible tube 12 may be maintained in its desired bent condition by means of rope 29. When the knob 14 is rotated in the opposite direction the same result is obtained.

Figure 8:
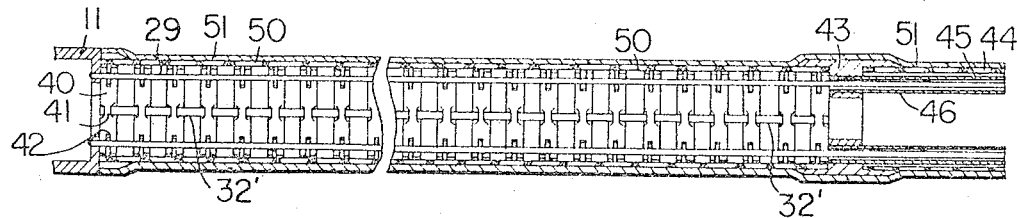
FIG. 8 is fragmentary, longitudinally sectional view of a flexible tube embodying the present invention for use in the various light-transmitting instruments of the present invention.
Figure 9:
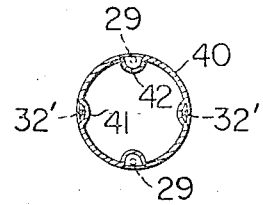
FIG. 9 is a cross sectional view of a guide ring employed in the flexible tube of FIG. 8.
Figure 10:
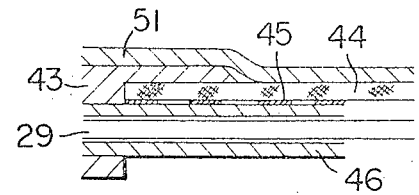
FIG. 10 is a fragmentary, longitudinal, sectional view of the tube shown in FIG. 8.

In FIGS. 8 to 10 inclusive, the details of a preferred form of the flexible tube which is employed in the above-mentioned, light-transmitting instrument are illustrated. The flexible tube shown is adapted to be connected by means of the sleeve member 11 to the distal end of the instrument body (not shown). The novel flexible tube comprises a plurality of guide rings 40 located in longitudinally spaced relation along the length of the tube. The number of these rings vary depending upon the length of the flexible tube to be formed. A flexible wire netting tube or blade 50 encircles the entire outer periphery of the guide rings for reinforcing the flexible tube, and a flexible rubber or plastic tube 51 encircling the entire netting tube 50 (this plastic tube will be referred to as "A Vinyl Coating Layer" hereinafter). As shown in FIGS. 8 and 9, each of these guide rings 40 is preferably formed of a thin walled metallic tube. The guide ring 40 is formed with a first pair of shallower pockets 41 in diametrically opposed positions in its outer periphery by any suitable means such as pressing, for example and a pair of wires 32' of non-extensible but flexible piano wire or stainless steel wire is successively passed through the respective loops 41 of a series of guide rings 40 in the opposite sides of the flexible tube 12 and these wires 32' are soldered in the respective pockets 41 thereby maintaining the distance between adjacent rings and forming an axis. Accordingly, in the so formed guide ring assembly or tube, each two adjacent rings of such a plurality of equally spaced guide rings 40 may maintain a predetermined space therebetween thereby to impart a predetermined amount of flexibility only in the plane perpendicular to the plane passing through the wires 32'. Each of the above guide rings 40 is further provided with a second pair of upper and lower deeper pockets 42 in diametrically opposed relation in its periphery in a diametrical line intersecting or perpendicular to the diametrical line passing through the side pockets 41 and these second pair of pockets may also be formed by pressing. The relatively inflexible, inextensible ropes 29, similar to those shown in FIG. 1 are successively passed through the series of upper and lower deeper pockets 42. The size of the deeper pockets 42 is sufficiently large to permit the maneuvering ropes 29 to freely pass through them. One end of the relatively inflexible tube is connected to the connecting sleeve member 11. One end of each maneuvering rope 29 is passed through one of the bores formed in the sleeve member 11 and firmly secured by soldering or any other suitable means. The outermost vinyl coating layer 51 is also connected at one end to the sleeve member. The other end of the rope 29 remote from the sleeve member 11 is similarly connected to a second connector or sleeve member 43 together with the adjacent end of the reinforcing wire netting tube 50. One end of the vinyl coating layer 51 extends over the sleeve member 43 and is disposed around the flexible tube portion at the proximal end including a conventional threaded metallic tube 45 and a shielding wire-netting tube 44 which are to be connected to the maneuvering or proximal end of the instrument body (not shown). However, the portion of the vinyl coating layer 51 which encircles the threaded tube 44 and wire-netting tube 45 is preferably separated from the remaining portion of the coating layer and is formed of a more flexible material different from the other vinyl coating layer portion. This increases the flexibility of the vinyl coating layer 51 thereby facilitating the maneuvering of the flexible tube 12. The maneuvering ropes 29 are passed through a pair of non-extendable but bendable tubes 46 which are firmly secured to the second connector sleeve member 43. These ropes are allowed to slidably move in these tubes 46 and pulled out at the opposite ends of the tubes 46 where the tubes are connected to the maneuvering or proximal end of the instrument body, in like manner as shown in FIGS. 1 and 5. The maneuvering ropes 29 are connected to the control means provided at the maneuvering end of the instrument body. Since the pair of maneuvering ropes 29 are pulled out or pushed out in the mutually opposite directions by manipulating the control means and the tubes 46 and maneuvering ropes 29 are inextensible, the pulling out or pushing out movement of the maneuvering ropes 29 relative to the flexible tubes 46 which may be imparted the ropes from the proximal or maneuvering end of the instrument is transmitted to the second sleeve member 43 as a precise movement relative to the tubes 46 secured to the second sleeve member 43. The length of the inextensible tubes 46 and maneuvering ropes 29 therein is substantially longer than the length of the conventional flexible tubes 44 and 45, and therefore, even though the flexible tubes 44 and 45 may flex, the inextensible and incompressible tubes 46 and ropes 29 disposed therein will not change their relative positions given by the control means of FIG. 6 by such flexing of the flexible tubes 44 and 45. However, instead of the provision of the tube 46, the flexible members may be formed with a comparatively rigid construction and made harder to flex than in case of the flexible tubes 44 and 45 as mentioned above.

As is clear from the foregoing, a force imparted to the maneuvering ropes 29 by the control means at the maneuvering or proximal end is precisely transmitted to the ropes 29, the second connector or sleeve member 43. Since the guide ring assembly the individual guide rings 40 maintain their predetermined spaced relation by the wires 32' passing through the side pockets 41 as the pair of maneuvering ropes 29 are pulled or pushed out in the mutually opposite directions, the guide ring assembly may freely flex either in the upward or downward direction. In FIGS. 8 and 9, the guide ring assembly is shown as flexing in the upward and downward direction, but when this assembly is turned by an angle of 90°, the assembly may flex in the lateral direction whereby the assembly may be freely inserted into a bent portion of a human body to be examined in conformity with the contour of the object. After the flexible tube has been inserted within the object the distal end of the light transmitting instrument may be easily oriented as desired.

With the above construction and arrangement of the flexible tube, the flexible tube may be freely bent within a permissible flexing range and has a larger effective inner capacity for housing examining elements. Accordingly, the tube may be formed as a compact unit suitable for any internal examination instrument.

FIGS. 11 and 12 illustrate a modified form of light-transmitting instrument and in which the focusing of the objective lenses is effected by backward or forward sliding movement of the distal end portion of the fiber bundle relative to the objective lens system, which construction is different from the embodiment of FIGS. 1 to 7 in which the objective lenses are moved for properly focusing the lenses.

FIG. 11 illustrates the distal end portion of the modified light transmitting instrument and as shown in this figure, a spherical cap 7 is provided at the extreme end of the instrument and a cylindrical sheath member 8 is connected to the cap by the complementary portions on the cap 7 and sheath member 8. A lamp 1 is housed within the sheath member 8 and the lamp is adapted to emit its light through a transparent window 1' provided in the periphery of the sheath member 8. The supply of electric power to the lamp 1 is controlled by means of suitable conductors. A transverse partition 2 is provided within the sheath member 8 extending perpendicularly to the longitudinal axis of the sheath member and the partition is provided on its one surface with an insulating member for supporting one contact of the lamp 1. A cylindrical barrel 5 is disposed on the other side of the partition 2 remote from the lamp 1 within the sheath member 8 and the barrel 5 holds a frame member 5' for holding the objective lens system 4 in place. Slidably disposed adjacent to the cylindrical barrel 5 in the cylindrical sheath is a binding member 10' for securing the distal ends of the fibers of a fiber bundle 6 which extends from the rear end of the cylindrical sheath member 8 towards the proximal or maneuvering end portion of the instrument through the tube 12. A stationary ring member 47 is provided adjacent to but apart from the binding member 10' within the sheath member 8. The tube 32 of small diameter is secured at one end within a bore formed in the stationary member 17. A relatively inflexible cable 31 extends through the tube 32. One end of the cable 31 extends beyond one end of the tube 32 and stationary member 47 into a guide groove formed in the binding member 10'' and is secured therein by means of a set screw 10'. Therefore, by manipulating the cable 31 at the maneuvering or proximal end portion of the instrument, the binding member 10' may slide within the sheath member 8 within a predetermined distance range. The binding member 10' is allowed to slide in the longitudinal direction but prevented from rotating by means of a retaining stopper 10a which fits within the adjacent guide grooves formed in the binding member 10' and stationary member 47 respectively.

A prism 3 is disposed on the front surface of the cylindrical barrel 5 and is adapted to reflect light which enters through a light window 9 provided in the sheath member 8 in alignment with the transparent window 1' so that the light may be passed through an iris provided on the front wall of the lens frame 5' to the objective lens system 4. The light is picked up at the distal end 6' of the fiber bundle 6 as an image. The cylindrical sheath 8 is disposed at the rear end around a portion of a connector or sleeve member 11 and the other portion of the connector or sleeve is surrounded by the fore end portion of a flexible tube 12 within which the fiber bundle 6 extends through to the maneuvering end portion of the instrument body 15 whereby an image is transmitted from one end to the other end of the fiber bundle 6 and can be viewed by an eyepiece 13 as a magnified image. The other end of the cable 31 is secured to one end of a slide plate 33 supported by a retaining plate 35 by means of a set screw 34 transversely extending into the instrument body 15. When the slide plate 33 is caused to slide by manipulation of a shifting device 36 provided on the body 15, in the manner as described in connection with the previous embodiment, the movement of the slide plate is precisely transmitted through the cable 31 to the binding member 10'.

In the modified embodiment of the light-transmitting instrument, when it is desired to shift the slide plate 33, the shifting device 36 is pushed so as to urge a spherically pointed pin 36'' against the dome-shaped projection on the surface of a shifting plate 37. The pin 36'' extends through the axial bore of the shank of the shifting device 36 and has a spring 37' disposed around the pin whereby the slide plate 33 may be moved to a desired position. In this way, the position of the slide plate 33 can be adjusted depending upon the direction in which the shifting device 36 is pushed.

In this modified embodiment, the position of the bound end of the fiber bundle can be adjusted by pushing the shifting device 36 in one or the other direction. As contrasted with the previous embodiment in which observation is effected by moving the objective lens system, the position of the image in the modified embodiment does not move assuring more convenient image observation and operation of the instrument regardless of any flexing of the flexible tube.

I claim:

1. A light-transmitting instrument comprising an elongated tubular body (15), a knob rotatably disposed on said body having a shaft transversely extending into said body, a disc fitted around said shaft and having a pin projecting on one surface, a drum disposed around said shaft in co-axial relation with said disc for rotational movement relative to said disc and having an elongated arcuate slot for receiving said pin of the disc, a ratchet wheel fixedly mounted in said body, a pair of pawls rotatably disposed on one surface of said drum in a symmetric relation with respect to said elongated slot, each of said pawls having one end adapted to rock over said elongated slot and the other end adapted to engage said ratchet wheel, said other ends of the pawls being normally spring-biased into engagement with said ratchet wheel, whereby when said knob is rotated in one or the other direction, said pin is caused to move within said slot against one pawl a portion of which lies in the path of the movement of the pin thereby to move said one pawl from its engagement with the ratchet wheel to permit said knob to continue its rotational movement while the other pawl maintains its engagement with the ratchet wheel by means of its associated spring for prevention of rotation in the reverse direction of the knob; said instrument further including a pair of relatively inflexible ropes, a distal end sleeve member (11) and a flexible tube connected between said body and said sleeve member, a plurality of guide rings (40) longitudinally spaced along said flexible tube, said ropes being slidably retained in said plurality of guide rings, said ropes being under tension, a portion of said ropes being wound around said drum for movement in mutually opposite directions with their one ends secured to said drum and their other ends secured to the opposite sides of said sleeve member.

2. The light-transmitting instrument of claim 2, said plurality of guide rings being formed with at least two pockets, said at least two pockets being arranged opposite each other on the inner surface of each one of said plurality of guide rings, said ropes passing through said at least two pockets.

3. The light-transmitting instrument of claim 2, further comprising a plurality of teeth disposed around the circumference of said ratchet wheel, two blocking surfaces, each one of said other ends of said pair of pawls comprising one of said two blocking surfaces, one of said two blocking surfaces opposing clockwise rotation of said drum whenever said one blocking surface is in contact with one of said teeth, the other of said two blocking surfaces opposing counter-clockwise rotation of said drum whenever said other blocking surface is in contact with one of said teeth, said teeth being spaced such that whenever said pin is in the longitudinal center of said slot said two blocking surfaces are in simultaneous contact with a corresponding two said teeth thereby preventing said drum from rotating in either direction.